United States Patent
Magee

(10) Patent No.: US 6,834,751 B1
(45) Date of Patent: Dec. 28, 2004

(54) CONE CLUTCH WITH IMPROVED OIL EVACUATION STRUCTURE

(75) Inventor: Phillip D. Magee, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/459,999

(22) Filed: Jun. 12, 2003

(51) Int. Cl.[7] ................................................ F16H 1/44
(52) U.S. Cl. ............... 192/48.91; 192/66.2; 192/107 R; 192/113.36
(58) Field of Search .................. 192/48.8, 48.91, 192/66.2, 107 R, 113.36

(56) References Cited

U.S. PATENT DOCUMENTS

| | | | | |
|---|---|---|---|---|
| 1,988,967 A | * | 1/1935 | Emrick | 192/21 |
| 3,327,563 A | * | 6/1967 | Engle | 475/235 |
| 4,244,454 A | | 1/1981 | Bankstahl | 192/21 |
| 4,257,506 A | | 3/1981 | Bankstahl | 192/21 |
| 4,545,469 A | | 10/1985 | Yogome et al. | 192/51 |
| 4,612,825 A | * | 9/1986 | Engle | 475/235 |
| 4,630,719 A | | 12/1986 | McCormick | 192/21 |
| 4,679,682 A | | 7/1987 | Gray, Jr. et al. | 192/21 |
| 4,763,765 A | | 8/1988 | Black | 192/48.91 |
| 4,869,121 A | | 9/1989 | Meisenburg | 74/323 |
| 4,924,984 A | | 5/1990 | Kennedy | 192/58 B |
| 5,101,953 A | | 4/1992 | Payvar | 192/107 R |
| 5,226,861 A | * | 7/1993 | Engle | 475/234 |
| 5,858,511 A | * | 1/1999 | Lisowsky | 428/167 |
| 6,062,360 A | | 5/2000 | Shields | 192/21 |
| 6,076,644 A | * | 6/2000 | Forrest et al. | 192/66.2 |
| 6,261,202 B1 | | 7/2001 | Forrest et al. | 475/235 |
| 6,523,655 B1 | | 2/2003 | Behara | 192/21 |

* cited by examiner

Primary Examiner—Saul Rodriguez
(74) Attorney, Agent, or Firm—William D. Lanyi

(57) ABSTRACT

A cone clutch is made with a plurality of generally straight grooves machined into the clutch faces of the cone clutch. This allows rapid and efficient evacuation of oil from the clutch faces as the clutch face moves into contact with a mating friction surface. By simplifying the evacuation path for the oil, the operation of the cone clutch is made more predictable and consistent.

19 Claims, 3 Drawing Sheets

US 6,834,751 B1

CONE CLUTCH WITH IMPROVED OIL EVACUATION STRUCTURE

BACKGROUND OF THE INVENTION

1. Field of the Invention

The present invention is generally related to a cone clutch, and, more particularly, to a cone clutch with grooves formed in its clutch faces which are generally straight and which provide an efficient evacuation path for oil when the clutch face moves into contact with an opposing surface.

2. Description of the Prior Art

Cone clutches are used in many different applications. Typically, a cone clutch is provided with one or more friction faces. Each friction face is generally shaped as a frustum of a cone to provide a tapered friction surface that is engaged by another rotating member. Cone clutches are used extensively in certain types of marine propulsion systems.

U.S. Pat. No. 4,257,506, which issued to Bankstahl on Mar. 24, 1981, discloses a shift linkage for cone clutch. The male cone member of a cone clutch mechanism has two springs, each encircling cam faces on the male cone member and bearing against the forward and reverse clutch gears, respectively, to bias the cone member away from its center or neutral position toward either the forward or reverse clutch gear. An eccentric roller on the shift actuator shaft engages with a circumferential groove in the male cone member to provide a vibrating force against the member for shifting. The shift means uses a cam and bell crank mechanism to convert axial movement of the shift control to rotary movement of the actuator shaft.

U.S. Pat. No. 4,244,454, which issued to Bankstahl on Jan. 13, 1981, discloses a cone clutch mechanism which has its forward and reverse clutch gears supported by bearings mounted on the housing, with a main shaft supported by bearings mounted on the housing in the same plane as the forward and reverse gear bearings. The male cone member is biased by two springs, each encircling cam faces on the member and bearing against the forward and reverse clutch gears, respectively, to bias the cone member away from its center or neutral position.

U.S. Pat. No. 4,630,719, which issued to McCormick on Dec. 23, 1986, discloses a torque aided pulsed impact shift mechanism. A cone clutch sleeve on a main shaft is moved axially between forward and reverse counter-rotating gears by a yoke having mirror-image oppositely tapered cams on opposite sides thereof which are selectively rotatable to engage eccentric rings on the forward and reverse gears. The engagement drives the yoke away from the one engaged gear and toward the other gear to in turn drive the clutch sleeve out of engagement with the one gear such that torque applied through the cam-engaged gear ring assists clutch disengagement of the one gear such requisite shift force decreases as speed and torque increases. The eccentric face surface of each ring actuates the yoke and drives the sleeve member out of engagement with the one gear and into engagement with the other gear with a pulsed impact hammer effect due to the eccentricity of the face surface as it rotates in a circumferential plane about the main shaft. U.S. Pat. No. 4,679,682, which issued to Gray et al on Jul. 14, 1987, discloses a marine drive shift mechanism with detent canister centered neutral. A marine drive is provided with a shift mechanism including a detent canister assembly. A cylindrical canister contains a ball biased by a pair on concentric springs into engagement with a shift lever arm to center the latter in a neutral position. The canister assembly is a self-contained modular unit inserted into the marine drive housing. The cylindrical canister has a left end wall with an aperture therethrough and has an open right end containing the ball. The first spring bears at its right end against the ball and extends axially leftwardly through the aperture in the left end wall of the canister and bears at its left end against the housing.

U.S. Pat. No. 4,869,121, which issued to Meisenburg on Sep. 26, 1989, discloses a marine propulsion unit with an improved drive shaft arrangement. A marine propulsion unit is provided wherein the main drive shaft includes an integrally formed annular portion of enlarged diameter at the location of a previously utilized lower groove and keepers. The enlarged diameter portion increases the mass and strength of the shaft at a position subject to substantial torque forces, thus substantially eliminating the problems of shaft fracture or breakage. In addition, the enlarged diameter portion is formed in the shape of a thrust collar so that the shaft can be accommodated by the previous known shaft mounting elements without redesign of the latter.

U.S. Pat. No. 6,523,655, which issued to Behara on Feb. 25, 2003, discloses a shift linkage for a marine drive unit. The shift linkage is provided with a groove that is aligned along the path which is nonperpendicular to an axis of rotation of the shift-linkage. The groove, and its nonperpendicularity to the axis of rotation, allows a detent ball to smoothly roll and slide along the groove. This relationship helps to maintain the shift linkage in a desired vertical position as it passes from one gear selection position to another.

U.S. Pat. No. 6,062,360, which issued to Shields on May 16, 2000, discloses a synchronizer for a gear shift mechanism for a marine propulsion system. Using a hub and a sleeve that are axially movable relative to an output shaft but rotationally fixed to the shaft and to each other, the gear shift mechanism uses associated friction surfaces to bring the output shaft up to a speed that is in synchronism with the selected forward or reverse gear prior to mating associated gear tooth surfaces together to transmit torque from an input shaft to an output shaft. The friction surfaces on the forward and reverse gears can be replaceable to facilitate repair after the friction surfaces experience wear.

The United States patents described above relate to the use of cone clutches in conjunction with marine propulsion systems. It should be understood that cone clutches are also used in many non-marine applications.

U.S. Pat. No. 6,261,202, which issued to Forrest et al on Jul. 17, 2001, describes a cone clutch structure having recessed areas for use in a limited slip differential. A limited slip differential having at least one cone clutch element for frictionally engaging an interior surface of the rotatable differential casing is provided. The cone clutch element has a plurality of clutch engagement surfaces which are disposed about the outside surface of the cone clutch element. Recessed areas are interposed between the clutch engagement surfaces. The total clutch engagement surface is reduced to between 5% and 15% of the total engagement and recessed surface area of the clutch element to improve the performance of the differential at low temperatures.

It is generally known to provide grooves in clutch surfaces. U.S. Pat. No. 5,101,953, which issued to Payvar on Apr. 7, 1992, describes a high capacity viscous pumping groove pattern for a wet clutch. A groove pattern for the paper-based friction facing on a wet clutch is provided to equalize the surface temperature of the friction facings and thus increase the thermal capacity of the clutch where there is continuous slippage. The groove pattern includes one or more continuous annular grooves dividing the friction area into two or more annular bands and a plurality of cross grooves in each bank which are angled with respect to a radius of the facing. The angled cross grooves increase in number in each band from the inner band to the outer band. The angled cross grooves extend at an acute angle, such as 10–50 degree, to the radius. Slip of the friction pair of plates causes a viscous pumping action. The cross groove angle in each band of the facing is preferably different so as to keep all of the grooves filled with cooling oil.

U.S. Pat. No. 4,924,984, which issued to Kennedy on May 15, 1990, describes a quick pump-out clutch plate for a viscous fluid clutch. A fan clutch assembly for a vehicle includes a clutch plate rotatably driven by an input shaft. The clutch plate includes a plurality of concentric, annular lands and grooves which are mated with complementary lands and grooves of a clutch body to form a shear zone. A plurality of passages are provided in the clutch plate lands and grooves for directing fluid from a reservoir to the shear zone. A plurality of radial channels are provided in the clutch plate lands and grooves to expel fluid from the shear zone and to a receiving chamber of the clutch plate assembly. Each channel is aligned with and leads radially outwardly from a respective passage. Preferably, each groove includes an aligned notch provided on the circumference of the clutch plate. The notch includes a mouth on the surface on the clutch plate adjacent the lands and grooves and an exit on the surface of the clutch plate adjacent a receiving chamber. An angled wall provided with each notch directs fluid from a channel to the receiving chamber of the plate assembly.

U.S. Pat. No. 4,763,765, which issued to Black on Aug. 16, 1988, describes a cone clutch transmission. A drive member such as a gear of a pulley cooperates with a pair of clutch elements, each of which has a splined connection with a shaft. One clutch element is axially fixed. The other is shiftable through a small distance toward and from the fixed one. Each clutch element has a conical surface concentric to the shaft that tapers oppositely to the conical surface on the other. The driveshaft has an inner periphery of larger diameter than the shaft and has oppositely tapering conical surfaces that respectively mate with the conical surfaces on the clutch elements, which thus at all times maintain the drive member coaxial with the shaft and confine it against axial shifting. An actuator urges the shiftable clutch element towards the fixed one to engage the clutch elements with the drive member. A spring biases the clutch elements apart so that the mating conical surfaces can serve as bearings lubricated by oil delivered through the shaft.

U.S. Pat. No. 4,545,469, which issued to Yogome et al on Oct. 8, 1985, describes a cone clutch. The disclosure describes a cone clutch comprising an axially unslidable rotation shaft, a cone body connected to the rotation shaft through a helical spline, adapted to be axially shifted by a shifter or the like, and provided at the outer periphery with a pair of conical faces for frictional engagement, a pair of cone cups disposed at both sides of the cone body, carried rotatably and axially slidable on the rotation shaft, and provided with a pair of conical faces operable to frictionally engage with the faces of the cone body respectively, rotation forces transmitting mechanism for transmitting rotation forces in respectively opposite directions to the cone cups, and spring mechanism disposed between the rear sides of the cups for forcing the rear faces of the cone cups toward the cone body, respectively.

The patents described above are hereby expressly incorporated by reference in the description of the present invention.

In order to provide consistent and predictable operation of a cone clutch, it would be helpful if a system or structure could be provided which allows efficient evacuation of oil from the clutch faces in a repeatable and predictable manner. It would also be significantly beneficial if a cone clutch could be provided which is not subject to variability of operation as a result of slight variations in manufacturing which may cause slight differences in the structure of the clutch face and its associated grooves.

SUMMARY OF THE INVENTION

A clutch component, made in accordance with the preferred embodiment of the present invention, comprises a first clutch face having a first inner edge. The first inner edge is generally circumferential, in a particularly preferred embodiment, and the first clutch face is rotatable about an axis of rotation which is generally perpendicular to the first inner edge. It also comprises a first plurality of grooves formed in the first clutch face, wherein each of the first plurality of grooves is formed as a generally straight line between a first inner terminus and a first outer terminus. The first inner terminus of each of the first plurality of grooves is disposed proximate the first inner edge, with each of the first plurality of grooves extending from the first inner edge at a first preselected angle between 15 degrees and 75 degrees.

In a particularly preferred embodiment of the present invention, the first preselected angle is between 15 degrees and 45 degrees. One particular embodiment of the present invention incorporates a first preselected angle which is generally equal to 30 degrees.

A first outer edge of the first clutch face is also provided in a particularly preferred embodiment of the present invention. The first outer edge is generally circumferential and the first clutch face is disposed between the first inner and outer edges. The first outer terminus of each of the first plurality of grooves can be disposed proximate the first outer edge. The diameter of the first outer edge is less than the diameter of the first inner edge and, as a result, the first clutch face is shaped as a frustum of a cone.

In a typical application of the present invention, a second clutch face is provided which is similarly structured to the first clutch face, but facing in an opposite direction. The first and second clutch faces are supported by a common structure, with the first and second inner edges being disposed toward each other and the first and second outer edges being disposed to face away from each other. In one embodiment of the present invention, each of the first and second plurality of grooves has a bottom surface that is generally rounded in cross-section. The first plurality of grooves comprises less than 30 percent of the total area of the first clutch face in a preferred embodiment of the present invention. Similarly, the second plurality of grooves comprises less than 30 percent of the total area of the second clutch face.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
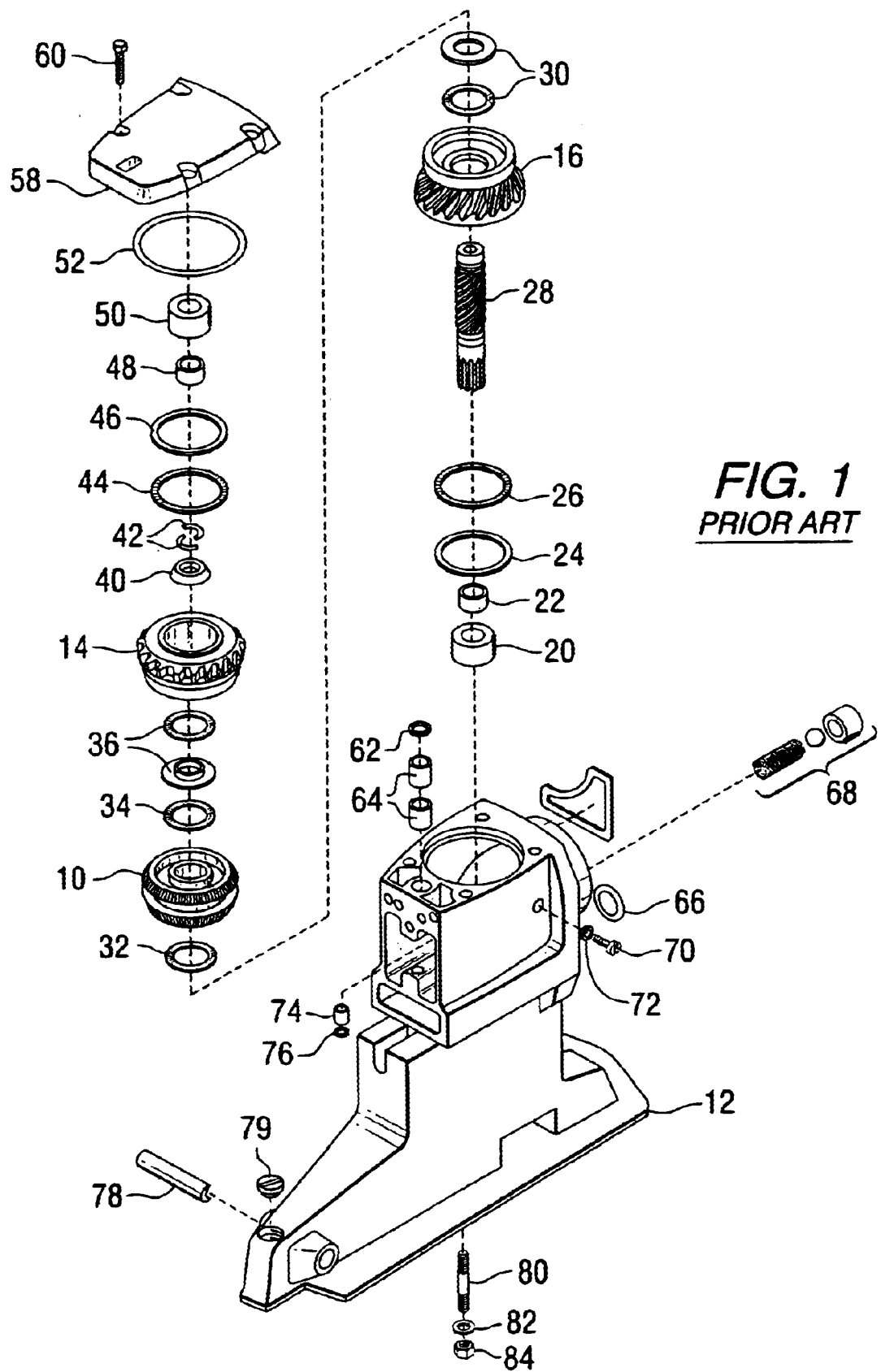
FIG. 1 is an exploded isometric view of a marine drive in which the present invention can be used.

Throughout the description of the preferred embodiment of the present invention, like components will be identified by like reference numerals.

FIG. 1 is an exploded isometric view of a known marine drive unit that comprises a cone clutch 10. The marine drive unit comprises a driveshaft housing assembly 12 into which forward and reverse gears, 14 and 16, are contained along with associated components. For example, a bearing 20, a roller bearing 22, thrust bearings, 24 and 26, an upper drive shaft 28, and a bearing assembly 30 are shown. In addition, portions, 32 and 34, of the clutch assembly are used in conjunction with the cone clutch 10 along with a thrust bearing assembly 36. A thrust collar 40, keeper springs 42, thrust bearings, 44 and 46, a roller bearing 48, bearing 50, and o-ring 52 are shown in FIG. 1. The top cover assembly 58 is held in place with a plurality of screws 60. An o-ring 62 and bushing kit 64 are provided, along with o-ring 66 and a spring kit 68. A drain screw 70 and washer 72 are shown in FIG. 1 along with a bushing kit 74, oil seal 76, trim adjustment insert 78, and plug 79. Reference numeral 80 identifies a stud along with a washer 82 and nut 84.

Figure 2:
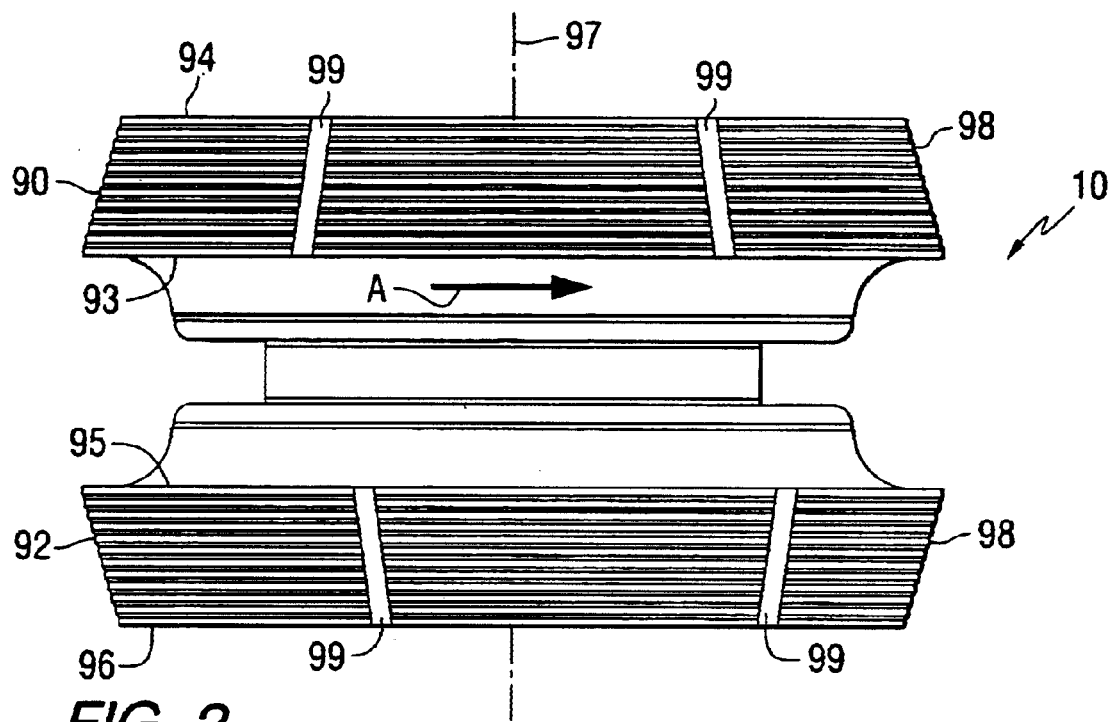
FIG. 2 is a side view of a cone clutch known to those skilled in the art.

FIG. 2 shows a known type of cone clutch 10. It has a first clutch face 90 and a second clutch face 92. The first clutch face 90 has a first inner edge 93 and a first outer edge 94. Similarly, the second clutch face 92 has a second inner edge 95 and a second outer edge 96. The cone clutch 10 is intended to rotate about an axis of rotation 97. An oil evacuation arrangement in this type of known cone clutch 10 comprises one or more spiral grooves 98 formed in each of the first and second clutch faces, 90 and 92, and a plurality of intersecting grooves 99. Each of the first and second clutch faces, 90 and 92, is typically provided with six intersecting grooves 99. When one of the clutch faces, 90 or 92, moves toward contact with a mating friction surface of a gear, such as those identified by reference numerals 14 and 16 in FIG. 1, oil which is proximate that clutch face, 90 or 92, will be induced to move along that clutch face in a direction which is coincident with the direction of rotation of the mating surface. In other words, if a rotating gear has a mating surface toward which the clutch face 90 is moved and the gear's friction surface is moving in the direction of arrow A, it will induce movement of oil proximate the first clutch face 90 in that same direction. The oil will move within the thread 98 and along the land portion of the clutch face between the segments of the thread 98. Eventually, this oil will reach one of the intersecting grooves 99 and begin to flow within the intersecting groove. This movement of oil evacuates the region proximate the clutch face 90. One problem that is often experienced in conjunction with a cone clutch similar to that shown in FIG. 2 is that the pathway available for oil flow is somewhat tortuous. In other words, oil flowing in a direction from left to right in FIG. 2 in spiral groove 98 of the first clutch face 90 must turn at a severe angle in order to enter an intersecting groove 99. Depending on where the majority of the oil is located at the time when the first clutch face 90 moves toward a mating friction surface of a gear, such as gear 14 or 16 in FIG. 1, the evacuation process can be variable. Manufacturing variability can also induce a degree of unpredictability in the precise behavior of the oil when the mating friction surfaces are moved into contact with each other and the oil is forced to be evacuated through a section of the spiral groove 98 and, subsequently through an intersection groove 99. Manufacturing tolerances, in combination with the tortuous path along which the oil is required to flow during the engagement process, can lead to deleterious variability between different cone clutches made according to the same design and between sequential operations of the same cone clutch system.

Figure 3:
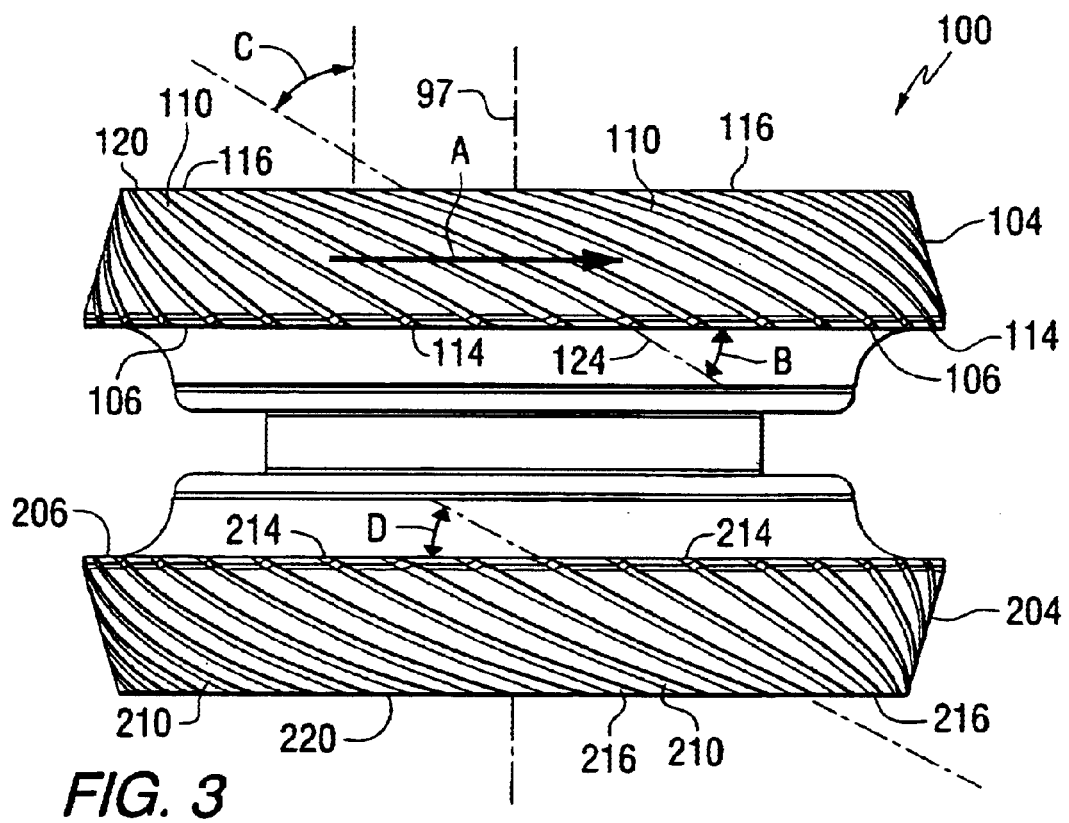
FIG. 3 is a side view of a cone clutch made in accordance with the concepts of the present invention.

FIG. 3 is a side view of a cone clutch 100 made in accordance with a preferred embodiment of the present invention. A first clutch face 104 has a first inner edge 106. The first inner edge 106 is generally circumferential of a circle having a center along the axis of rotation 97. The first clutch face 104 is rotatable about the axis of rotation 97 which is generally perpendicular to the first inner edge 106 as shown in FIG. 3. A first plurality of grooves 110 is formed in the first clutch face 104. Each one of the first plurality of grooves 110 is formed as a generally straight line between a first inner terminus 114 and a first outer terminus 116. It should be understood that, although the grooves appear to be curved in FIG. 3, they are actually formed along straight lines between their termini, 114 and 166. Because of the tapered shape of the first clutch face 104, the straight grooves appear to be curved. The intent of the present invention is to allow each of, the plurality of grooves 110 to be machined by passing a cutter (e.g. a milling cutter) along a straight line path between the first inner edge 106 and the first outer edge 120 at a preselected angle to the first inner edge 106.

With continued reference to FIG. 3, the first inner terminus 114 of each of the first plurality of grooves 110 is disposed proximate the first inner edge 106. In this way, oil flowing downwardly (in FIG. 3) through each of the grooves 110 can flow into the central region of the cone clutch 100 as it exits through the first inner terminus 114. As illustrated through the use of line 124 in combination with the first inner edge 106, each of the first plurality of grooves 110 extends from the first inner edge 106 at a first preselected angle B. In a preferred embodiment of the present invention, the first preselected angle B is between 15 degrees and 75 degrees. In a most preferred embodiment, the first preselected angle B is between 15 degrees and 45 degrees and, in one embodiment of the present invention, the preselected angle B is approximately 30 degrees. This makes complimentary angle C equal to approximately 60 degrees in that particular embodiment.

The first outer edge 120 of the first clutch face 104 is generally circumferential and, in combination with the first inner edge 106, defines the limits of the first clutch face 104. In certain embodiments of the present invention, the first outer terminus 116 of each of the first plurality of grooves 110 is disposed proximate the first outer edge 120.

The diameter of the first outer edge 120 is less than the diameter of the first inner edge 106. This results in a first clutch face 104 which is shaped as a frustum of a cone.

With continued reference to FIG. 3, a second clutch face 204 has a second inner edge 206 which is generally circumferential about the axis of rotation 97. The second clutch face 204 is rotatable about the axis of rotation 97 which is generally perpendicular to the second inner edge 206. A second plurality of grooves 210 is formed in the second clutch face 204, wherein each of the second plurality of grooves 210 is formed as a generally straight line between a second inner terminus 214 and a second outer terminus 216. The second inner terminus 214 of each of the second plurality of grooves 210 is disposed proximate the second inner edge 206. Each of the second plurality of grooves 210 extends from the second inner edge 206 at a second preselected angle D. In a preferred embodiment of the present invention, the second preselected angle D is between 15 degrees and 75 degrees. In a particularly preferred embodiment, the preselected angle is between 15 degrees and 45 degrees. In one embodiment of the present invention, the second preselected angle D is approximately 30 degrees. The second outer terminus 216 of each of the second plurality of grooves 210 is disposed proximate the second outer edge 220. The diameter of the second outer edge 220 is less than the diameter of the second inner edge 206. As a result, the second clutch face 204 is shaped as a frustum of a cone.

In a particularly preferred embodiment of the present invention, each of the first and second pluralities of grooves, 110 and 210, has a bottom surface that is generally semi-circular in cross-section with two generally flat sides. The first and second pluralities of grooves, in a particularly preferred embodiment of the present invention, comprise less than 30 percent of the total area of their respective first and second clutch faces, 104 and 204, respectively.

Figure 4:
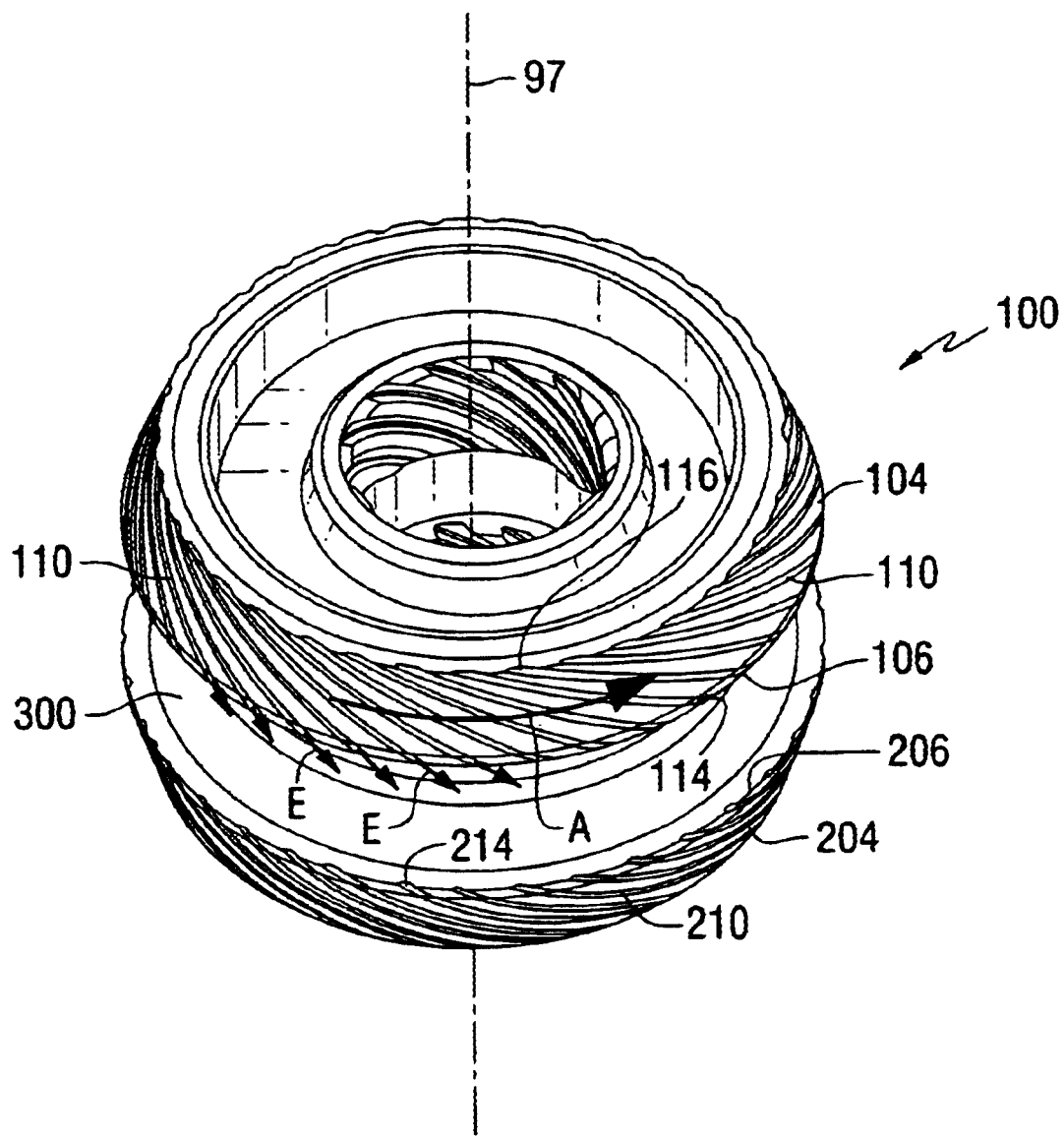
FIG. 4 is an isometric view of the cone clutch illustrated in FIG. 3.

FIG. 4 shows an isometric view of a cone clutch 100 made in accordance with the preferred embodiment of the present invention. The first clutch face 104 has a first inner edge 106. The first clutch face 104 is rotatable about the axis of rotation 97 which is generally perpendicular to a path of rotation of the first inner edge 106. In other words, the first inner edge 106, in accordance with the terminology used in this description of the preferred embodiment, is normally considered to be a generally circular edge that rotates along a path of rotation that is perpendicular to axis 97. However, it should be clearly understood that the first inner edge need not be physically formed as a circular edge. In applications where the first inner edge 106 is not circular and does not lie in a plane perpendicular to the axis 97, the path of rotation of any point, such as one of the first inner termini 114, in response to rotation of the cone clutch 100 should be considered to be the first inner edge 106. The first plurality of grooves 110 are formed in the first clutch face 104. Each of the first plurality of grooves 110 is shaped to provide a generally straight fluid passage between a first inner terminus 114 and a first outer terminus 116. The first inner terminus 114 of each of the first plurality of groves 110 is disposed proximate the first inner edge 106. Arrow A in FIG. 4 shows the path along which a mating friction surface of a gear component passes as the first clutch face 104 moves into engagement with the mating friction surface of the gear component. As it moves in the direction of arrow A, the associated friction face induces the movement of oil on the first clutch face 104 in the same direction. As the mating surfaces move toward contact and engagement, the oil is induced to move toward the first inner terminus 114 of each of the first plurality of grooves 110. The oil then flows along the straight paths provided by the grooves 10 and into the central region 300 of the cone clutch 100, as represented by arrows E. The oil has a generally unrestricted path because of the general straightness of each of the grooves 110 and the lack of need for the oil to turn along sharp angles as is the case with cone clutches made in accordance with the prior art.

The oil moves in a direction from the first outer terminus 116 toward the fist inner terminus 114 within each of the first plurality of grooves 110. The preselected angle, B or D in FIG. 3, can be any one of several magnitudes depending on the intended operation and environment of the cone clutch 100. In preferred embodiments of the present invention, the first preselected angle is between 15 and 75 degrees and in a particularly preferred embodiment, the preselected angle is between 25 and 35 degrees. In one embodiment of the present invention which works satisfactorily, the preselected angle is approximately 30 degrees.

With continued reference to FIGS. 3 and 4, the present invention is intended to operate in a manner generally similar to cone clutches known to those skilled in the art, but with the improved oil evacuation structure provided by the generally straight grooves, 110 and 210. By comparing FIGS. 2 and 3, it can be seen that the evacuation path followed by oil that passes from the region of the clutch faces, 104 and 204, in a direction toward the center of the cone clutch structure is much more efficient and simplified than the more tortuous path that the oil must follow to be evacuated from the spiral grooves 98 and intersecting grooves 99 shown in FIG. 2. This improved efficiency of oil evacuation provides two is very significant benefits. First, the oil evacuation path is significantly simplified and allows the oil to flow along a straight line from the region of the clutch face to the central region between the first and second clutch faces, 104 and 204. This improved efficiency and avoidance of the tortuous path known to those skilled in the art makes the operation of the cone clutch less dependent on manufacturing tolerances. In other words, when the oil evacuation path is a tortuous path through two sets of separate machined grooves, such as 98 and 99, variations in manufacturing dimensions can have an effect on the efficiency with which the oil is evacuated. As a result, two cone clutches made according to the same design shown in FIG. 2 can behave differently in operation because of these manufacturing variabilities. This same characteristic can also cause a cone clutch 10 to operate differently on successive actuations of the clutch. Therefore, this first improvement provided by the present invention related directly to a consistency and predictability of operation of the clutch regardless of machining tolerances and manufacturing variability. A second advantage of the present invention is that it is much easier to manufacture. Rather than having to form the spiral thread 98 and then subsequently forming the intersecting grooves 99, the first and second pluralities of grooves, 110 and 210, of the present invention are formed by a relatively simple milling operation in which the milling cutter moves in a perfectly straight line between the inner and outer termini of the grooves.

Although the present invention has been described in particular detail and illustrated to show a preferred embodiment, it should be understood that alternative embodiments are also within its scope.

I claim:

1. A clutch component, comprising:
    a first clutch face having a first inner edge, said first inner edge being generally circumferential, said first clutch face being rotatable about an axis of rotation which is generally perpendicular to said first inner edge; and
    a first plurality of grooves formed in said first clutch face, each of said first plurality of grooves being formed as a generally straight line between a first inner terminus and a first outer terminus, said first inner terminus of each of said first plurality of grooves being disposed proximate said first inner edge, each of said first plurality of grooves extending from said first inner edge at a first preselected angle between 15 degrees and 75 degrees said first clutch face being shaped as a frustum of a cone.

2. The clutch component of claim 1, wherein:
    said first preselected angle being between 15 degrees and 45 degrees.

3. The clutch component of claim 1, further comprising:
    a first outer edge of said first clutch face, said first outer edge being generally circumferential, said first clutch face being disposed between said first inner and outer edges.

4. The clutch component of claim 3, wherein:
    said first outer terminus of each of said first plurality of grooves is disposed proximate said first outer edge.

5. The clutch component of claim 3, wherein:

a diameter of said first outer edge is less than a diameter of said first inner edge.

6. The clutch component of claim 1, further comprising:

a second clutch face having a second inner edge, said second inner edge being generally circumferential, said second clutch face being rotatable about said axis of rotation which is generally perpendicular to said second inner edge; and a second plurality of grooves formed in said second clutch face, each of said second plurality of grooves being formed as a generally straight line between a second inner terminus and a second outer terminus, said second inner-terminus of each of said second plurality of grooves being disposed proximate said second inner edge, each of said second plurality of grooves extending from said second inner edge at a second preselected angle between 15 degrees and 75 degrees.

7. The clutch component of claim 6, further comprising:

a second outer edge of said second clutch face, said second outer edge being generally circumferential, said second clutch face being disposed between said second inner and outer edges, said second preselected angle being between 15 degrees and 45 degrees, said second outer terminus of each of said second plurality of grooves being disposed proximate said second outer edge, a diameter of said second outer edge is less than a diameter of said second inner edge, said second clutch face being shaped as a frustum of a cone.

8. The clutch component of claim 7, wherein:

said first and second preselected angles are between 25 and 35 degrees.

9. The clutch component of claim 7, wherein:

said first and second clutch faces are supported by a common structure, said first and second inner edges being disposed toward each other and said first and second outer edges being disposed to face away from each other.

10. The clutch component of claim 6, wherein:

each of said first and second plurality of grooves has a bottom surface that is generally semicircular in cross section.

11. The clutch component of claim 6, wherein:

said first plurality of grooves comprises less than 30% of the total area of said first clutch face.

12. The clutch component of claim 6, wherein:

said second plurality of grooves comprises less than 30% of the total area of said second clutch face.

13. A clutch component, comprising:

a first clutch face having a first draining edge, said first clutch face being rotatable about an axis of rotation which is generally perpendicular to a path of rotation of said first draining edge; and a first plurality of grooves formed in said first clutch face, each of said first plurality of grooves being shaped to provide a generally straight fluid passage between a first draining terminus and a first other terminus, said first draining terminus of each of said first plurality of grooves being disposed proximate said first draining edge, each of said first plurality of grooves extending from said first draining edge at a first preselected angle between 15 degrees and 75 degrees, said first clutch face being shaped as a frustum of a cone.

14. The clutch component of claim 13, further comprising:

a first other edge of said first clutch face, said first clutch face being disposed between said first inner and other edges.

15. The clutch component of claim 14, further comprising:

a second clutch face having a second draining edge, said second clutch face being rotatable about said axis of rotation which is generally perpendicular to a path of rotation of said second draining edge; and a second plurality of grooves formed in said second clutch face, each of said second plurality of grooves being shaped to provide a generally straight fluid passage between a second draining terminus and a second other terminus, said second draining terminus of each of said second plurality of grooves being disposed proximate said second draining edge, each of said second plurality of grooves extending from said second draining edge at a second preselected angle between 15 degrees and 75 degrees.

16. The clutch component of claim 15, further comprising:

a second other edge of said second clutch face, said second clutch face being disposed between said second inner and other edges, said second preselected angle being between 15 degrees and 45 degrees, said second other terminus of each of said second plurality of grooves being disposed proximate said second other edge, a diameter of said second other edge is less than a diameter of said second draining edge, said second clutch face being shaped as a frustum of a cone.

17. The clutch component of claim 16, wherein:

said first and second preselected angles are between 25 and 35 degrees, said first and second clutch faces being supported by a common structure, said first and second draining edges being disposed toward each other and said first and second other edges being disposed to face away from each other.

18. A clutch component, comprising:

a first clutch face which is rotatable about an axis of rotation;

a first plurality of grooves formed in said first clutch face, each of said first plurality of grooves being formed as a generally straight line between a first draining terminus and a first other terminus, each of said first plurality of grooves extending from a line which is perpendicular to said axis of rotation at a first preselected angle between 15 degrees and 75 degrees; and a second clutch face which is rotatable about said axis of rotation;

a second plurality of grooves formed in said second clutch face, each of said second plurality of grooves being formed as a generally straight line between a second draining terminus and a second other terminus, each of said second plurality of grooves extending from a line which is perpendicular to said axis of rotation at a second preselected angle between 15 degrees and 75 degrees said first clutch face is a frustum of a cone, said second clutch face is a frustum of a cone.

19. The clutch component of claim 18, wherein:

each of said first plurality of grooves intersects a first draining edge of said first clutch face, each of said second plurality of grooves intersects a second draining edge of said second clutch face, said first and second clutch faces being attached to a common component for synchronous rotation about said axis of rotation.

* * * * *